United States Patent
McIntosh et al.

(10) Patent No.: US 11,720,932 B2
(45) Date of Patent: *Aug. 8, 2023

(54) COLLABORATIVE EDITING SERVICE

(71) Applicant: GROUPON, INC., Chicago, IL (US)

(72) Inventors: Sean McIntosh, Seattle, WA (US); Natalia Corominas Sustach, New York, NY (US); Francisco Jose Larrain, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,021

(22) Filed: Feb. 22, 2022

(65) Prior Publication Data

US 2022/0245678 A1 Aug. 4, 2022

Related U.S. Application Data

(63) Continuation of application No. 14/264,565, filed on Apr. 29, 2014, now Pat. No. 11,288,711.

(51) Int. Cl.
*G06Q 30/00* (2023.01)
*G06Q 30/0241* (2023.01)

(52) U.S. Cl.
CPC ................. *G06Q 30/0276* (2013.01)

(58) Field of Classification Search
None
See application file for complete search history.

(56) References Cited

U.S. PATENT DOCUMENTS

| | | | |
|---|---|---|---|
| 8,356,253 B2 | 1/2013 | Greer et al. | |
| 8,595,257 B1* | 11/2013 | Ovide | G06Q 50/01 |
| | | | 382/116 |
| 8,656,465 B1 | 2/2014 | Fong-Jones | |
| 9,087,035 B1* | 7/2015 | Bandaru | G06F 40/186 |
| 9,330,167 B1 | 5/2016 | Pendar | |
| 9,406,170 B1* | 8/2016 | Grampurohit | G06F 3/011 |
| 9,529,788 B1* | 12/2016 | Gupta | G06F 40/186 |
| 10,789,606 B1* | 9/2020 | Datar | G06Q 30/0207 |

(Continued)

OTHER PUBLICATIONS

Kordon; Marketing_computational_intelligence_in_industry; IEEE 2010; 8 pages 2010.*

(Continued)

*Primary Examiner* — Radu Andrei
(74) *Attorney, Agent, or Firm* — Alston & Bird LLP

(57) ABSTRACT

A method, apparatus, and computer program product are disclosed that improve the efficiency and speed with which promotions can be generated. The method includes creating a promotion builder document, wherein the promotion builder document comprises a set of data elements guiding assembly of a promotion. The method further includes storing the promotion builder document in a memory connected to a computer network, and authorizing, by a processor, one or more remote users to access, via the computer network, the promotion builder document. The method further includes modifying the promotion builder document in response to instructions from at least one of the one or more remote users and assembling the promotion based on the promotion builder document. A corresponding apparatus and computer program product are described herein.

21 Claims, 7 Drawing Sheets

(56) References Cited

U.S. PATENT DOCUMENTS

| | | | |
|---|---|---|---|
| 2002/0059327 A1 | 5/2002 | Starkey | |
| 2005/0222900 A1 | 10/2005 | Fuloria et al. | |
| 2005/0256778 A1 | 11/2005 | Boyd et al. | |
| 2007/0027765 A1 | 2/2007 | Collins et al. | |
| 2007/0064121 A1* | 3/2007 | Issa | H04N 1/00132 |
| 2007/0130014 A1 | 6/2007 | Altberg et al. | |
| 2007/0266133 A1* | 11/2007 | Bukovec | H04L 41/16 |
| | | | 709/223 |
| 2008/0091571 A1* | 4/2008 | Sater | G10H 1/0058 |
| | | | 705/26.5 |
| 2008/0287150 A1 | 11/2008 | Jiang et al. | |
| 2009/0089131 A1 | 4/2009 | Moukas et al. | |
| 2009/0106234 A1 | 4/2009 | Siedlecki et al. | |
| 2009/0132526 A1 | 5/2009 | Park | |
| 2009/0204493 A1 | 8/2009 | Kim | |
| 2009/0234707 A1* | 9/2009 | Perez | G06Q 20/10 |
| | | | 705/26.1 |
| 2009/0307604 A1 | 12/2009 | Giles et al. | |
| 2010/0036719 A1* | 2/2010 | Eklund | G06Q 30/02 |
| | | | 705/14.4 |
| 2010/0042503 A1 | 2/2010 | Farmer | |
| 2010/0057556 A1 | 3/2010 | Rousso et al. | |
| 2010/0076822 A1 | 3/2010 | Steelberg et al. | |
| 2010/0100545 A1 | 4/2010 | Jeavons | |
| 2010/0114719 A1 | 5/2010 | Steelberg et al. | |
| 2010/0131357 A1 | 5/2010 | Steelberg et al. | |
| 2010/0161619 A1 | 6/2010 | Lamere et al. | |
| 2010/0192193 A1 | 7/2010 | Olson et al. | |
| 2010/0218139 A1* | 8/2010 | Mital | G06F 16/2448 |
| | | | 715/810 |
| 2010/0324997 A1 | 12/2010 | Evans | |
| 2011/0004522 A1 | 1/2011 | Lee | |
| 2011/0010245 A1 | 1/2011 | Priebatsch et al. | |
| 2011/0054867 A1* | 3/2011 | Firminger | G06Q 10/10 |
| | | | 709/204 |
| 2011/0055142 A1* | 3/2011 | Firminger | G06Q 10/10 |
| | | | 706/54 |
| 2011/0087529 A1 | 4/2011 | Angell | |
| 2012/0036083 A1 | 2/2012 | Olexa | |
| 2012/0066601 A1 | 3/2012 | Zazula et al. | |
| 2012/0170571 A1* | 7/2012 | Antonelli | H04L 69/04 |
| | | | 370/352 |
| 2012/0179671 A1* | 7/2012 | Turner | G06F 16/95 |
| | | | 707/723 |
| 2012/0209673 A1 | 8/2012 | Park | |
| 2012/0213487 A1* | 8/2012 | Kamotani | H04N 1/00442 |
| | | | 386/230 |
| 2012/0271730 A1* | 10/2012 | McNall | G06Q 30/06 |
| | | | 705/26.4 |
| 2013/0041781 A1* | 2/2013 | Freydberg | G06Q 30/06 |
| | | | 705/27.1 |
| 2013/0054651 A1 | 2/2013 | Shepherd et al. | |
| 2013/0072160 A1 | 3/2013 | Lawson et al. | |
| 2013/0085804 A1 | 4/2013 | Leff et al. | |
| 2013/0144919 A1* | 6/2013 | Firminger | G06Q 10/10 |
| | | | 707/803 |
| 2013/0231999 A1 | 9/2013 | Emrich et al. | |
| 2013/0265592 A1 | 10/2013 | Bellagamba | |
| 2013/0282483 A1 | 10/2013 | Ruarte et al. | |
| 2013/0298202 A1 | 11/2013 | Warshavsky et al. | |
| 2013/0339847 A1 | 12/2013 | Bartek et al. | |
| 2014/0013212 A1* | 1/2014 | Von Haden | G06F 40/186 |
| | | | 715/243 |
| 2014/0040007 A1 | 2/2014 | Relyea et al. | |
| 2014/0143047 A1 | 5/2014 | Carter et al. | |
| 2014/0200905 A1* | 7/2014 | Gustafson | G16H 40/67 |
| | | | 705/2 |
| 2014/0222553 A1 | 8/2014 | Bowman | |
| 2014/0249908 A1 | 9/2014 | Staines et al. | |
| 2014/0297350 A1* | 10/2014 | Kidron | G06Q 10/06311 |
| | | | 705/7.18 |
| 2014/0297376 A1 | 10/2014 | Robertson | |
| 2014/0298198 A1 | 10/2014 | Kuchibhotla et al. | |
| 2014/0344035 A1 | 11/2014 | Hewett et al. | |
| 2021/0326909 A1* | 10/2021 | Kass | G06F 40/30 |

OTHER PUBLICATIONS

Meng; A_Framework_for_Extensible_Collaborative_Asset; IEEE 2007; pp. 477-484; 2007.*

U.S. Appl. No. 14/264,565, filed Apr. 29, 2014, U.S. Pat. No. 11,288,711, Issued.

Meng; A_Framework_for_Extensible_Collaborative_Asset-based_ Service_Engagement; IEEE 2007; pp. 477-484; 2007.

U.S. Application filed May 13, 2013; entitled "Method, Apparatus, and Computer Program Product for Classification and Tagging of Textual Data"; first named inventor: Pendar, U.S. Appl. No. 13/893,044.

U.S. Application filed Sep. 26, 2013; entitled "Automated Deal Guide Optimization"; first named inventor: Nkengla, U.S. Appl. No. 14/038,610.

* cited by examiner

COLLABORATIVE EDITING SERVICE

CROSS-REFERENCE TO RELATED APPLICATIONS

This application is a continuation of U.S. patent application Ser. No. 14/264,565, titled COLLABORATIVE EDITING SERVICE and filed Apr. 29, 2014, which is related to U.S. patent application Ser. No. 14/103,290, titled EDITORIAL CONTENT SERVICE and filed Dec. 11, 2013; and to U.S. patent application Ser. No. 14/196,117, titled UNLOCKING EDITORIAL CONTENT and filed Mar.4, 2014, which claims the benefit of U.S. Provisional Patent Application No. 61/918,261, titled UNLOCKING EDITORIAL CONTENT and filed Dec. 19, 2013. The entire contents of all of the above applications are incorporated herein by reference.

TECHNOLOGICAL FIELD

Example embodiments of the present invention relate generally to document generation and, more particularly, to a method and apparatus for improving the process of generating promotions.

BACKGROUND

Applicant has discovered problems with current methods for generating editorial content for promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for improving the process of generating promotions.

In a first example embodiment a method is provided for generating promotions. The method includes creating a promotion builder document, wherein the promotion builder document comprises a set of data elements guiding assembly of a promotion. The method further includes storing the promotion builder document in a memory connected to a computer network, and authorizing, by a processor, one or more remote users to access, via the computer network, the promotion builder document. Subsequently, the method further includes modifying the promotion builder document in response to instructions from at least one of the one or more remote users, and assembling the promotion by the processor based on the promotion builder document.

In some embodiments of the method, the set of data elements includes data elements identifying an identifier, a deal context, a set of one or more template recommendations, and a set of one or more template selections, and authorizing the one or more remote users to access the promotion builder document includes authorizing a subset of the one or more remote users to modify one or more data elements in the set of data elements. To this end, this authorizing operation may include receiving, from a remote user in the subset of the one or more remote users, instructions to modify one or more data elements of the set of data elements, determining that the remote user has the authority to modify the data elements, and modifying the data elements based on the received instructions. In some such embodiments, prior to modifying the element of the promotion builder document, the method further includes storing the promotion builder document as a previous version. One such embodiment includes receiving a request to retrieve one or more previous versions of the promotion builder document, and retrieving the one or more previous versions of the promotion builder document. Another such embodiment includes receiving a request to revert to a previous version of the promotion builder document, retrieving the previous version of the promotion builder document, and replacing the promotion builder document with the previous version.

In an instance in which multiple remote users are included in the subset, authorizing the subset of the remote users to modify one or more elements of the promotion builder document further comprises providing at least one of the remote users in the subset with authority to modify a different combination of elements of the promotion builder document than the remaining remote users in the subset.

In one embodiment of the method, assembling the promotion using the promotion builder document comprises generating a document based on one or more template recommendations included in the set of data elements, wherein variables from the template recommendations are replaced in the document by corresponding data from one or more template selections included in the set of data elements.

In another embodiment, the method may include enabling parallel access to the promotion builder document by more than one of the remote users. In this regard, the method may also further include enabling parallel modification of multiple elements of the promotion builder document by more than one of the remote users.

In yet another embodiment of the method, the remote users are not physically co-located with the memory.

In another example embodiment, an apparatus is provided for generating promotions. The apparatus includes a processor and a memory, the memory storing computer program code that, when executed by the processor, causes the apparatus to create a promotion builder document, wherein the promotion builder document comprises a set of data elements guiding assembly of a promotion, store the promotion builder document in a memory connected to a computer network, authorize one or more remote users to access, via the computer network, the promotion builder document, modify the promotion builder document in response to instructions from at least one of the one or more remote users, and assemble the promotion based on the promotion builder document.

In some embodiments of the method, the set of data elements includes data elements identifying an identifier, a deal context, a set of one or more template recommendations, and a set of one or more template selections, and authorizing the one or more remote users to access the promotion builder document includes authorizing a subset of the one or more remote users to modify one or more data elements in the set of data elements. To this end, this authorizing operation may include receiving, from a remote user in the subset of the one or more remote users, instructions to modify one or more data elements of the set of data elements, determining that the remote user has the authority to modify the data elements, and modifying the data elements based on the received instructions. In some such embodiments, prior to modifying the element of the promotion builder document, the computer program code, when executed by the processor, causes the apparatus to store the promotion builder document as a previous version. In one such embodiment, the computer program code, when executed by the processor, causes the apparatus to receive a request to retrieve one or more previous versions of the promotion builder document, and retrieving the one or more previous versions of the promotion builder document. In another such embodiment, the computer program code, when executed by the processor, causes the apparatus to receive a request to revert to a previous version of the promotion builder document, retrieve the previous version of the promotion builder document, and replace the promotion builder document with the previous version.

In an instance in which multiple remote users are included in the subset, authorizing the subset of the remote users to modify one or more elements of the promotion builder document further comprises providing at least one of the remote users in the subset with authority to modify a different combination of elements of the promotion builder document than the remaining remote users in the subset.

In one embodiment of the method, assembling the promotion using the promotion builder document comprises generating a document based on one or more template recommendations included in the set of data elements, wherein variables from the template recommendations are replaced in the document by corresponding data from one more template selections included in the set of data elements.

In another embodiment, the computer program code, when executed by the processor, may cause the apparatus to enable parallel access to the promotion builder document by more than one of the remote users. In this regard, the computer program code, when executed by the processor, may further enable parallel modification of multiple elements of the promotion builder document by more than one of the remote users.

In yet another embodiment of the method, the remote users are not physically co-located with the memory.

In another example embodiment, a computer program product is provided for generating promotions. The computer program product includes a computer-readable storage medium storing computer program code that, when executed by an apparatus, causes the apparatus to create a promotion builder document, wherein the promotion builder document comprises a set of data elements guiding assembly of a promotion, store the promotion builder document in a memory connected to a computer network, authorize one or more remote users to access, via the computer network, the promotion builder document, modify the promotion builder document in response to instructions from at least one of the one or more remote users, and assemble the promotion based on the promotion builder document.

In some embodiments of the method, the set of data elements includes data elements identifying an identifier, a deal context, a set of one or more template recommendations, and a set of one or more template selections, and authorizing the one or more remote users to access the promotion builder document includes authorizing a subset of the one or more remote users to modify one or more data elements in the set of data elements. To this end, this authorizing operation may include receiving, from a remote user in the subset of the one or more remote users, instructions to modify one or more data elements of the set of data elements, determining that the remote user has the authority to modify the data elements, and modifying the data elements based on the received instructions. In some such embodiments, prior to modifying the element of the promotion builder document, the computer program code, when executed by the apparatus, causes the apparatus to store the promotion builder document as a previous version. In one such embodiment, the computer program code, when executed by the apparatus, causes the apparatus to receive a request to retrieve one or more previous versions of the promotion builder document, and retrieving the one or more previous versions of the promotion builder document. In another such embodiment, the computer program code, when executed by the apparatus, causes the apparatus to receive a request to revert to a previous version of the promotion builder document, retrieve the previous version of the promotion builder document, and replace the promotion builder document with the previous version.

In an instance in which multiple remote users are included in the subset, authorizing the subset of the remote users to modify one or more elements of the promotion builder document further comprises providing at least one of the remote users in the subset with authority to modify a different combination of elements of the promotion builder document than the remaining remote users in the subset.

In one embodiment of the method, assembling the promotion using the promotion builder document comprises generating a document based on one or more template recommendations included in the set of data elements, wherein variables from the template recommendations are replaced in the document by corresponding data from one more template selections included in the set of data elements.

In another embodiment, the computer program code, when executed by the apparatus, may cause the apparatus to enable parallel access to the promotion builder document by more than one of the remote users. In this regard, the computer program code, when executed by the apparatus, may further enable parallel modification of multiple elements of the promotion builder document by more than one of the remote users.

In yet another embodiment of the method, the remote users are not physically co-located with the memory.

In yet another example embodiment an apparatus is provided for generating promotions. The apparatus includes means for creating a promotion builder document, wherein the promotion builder document comprises a set of data elements guiding assembly of a promotion. The apparatus further includes means for storing the promotion builder document in a memory connected to a computer network, and means for authorizing one or more remote users to access, via the computer network, the promotion builder document. Moreover, the apparatus further includes means for modifying the promotion builder document in response to instructions from at least one of the one or more remote users, and means for assembling the promotion based on the promotion builder document.

In another example embodiment, a method for generating promotions is provided. The method may include accessing a promotion builder document stored in a remote memory, wherein the promotion builder document comprises a set of data elements guiding assembly of a promotion, generating, by a processor, a visualization of a promotion based on the promotion builder document, and transmitting instructions to modify one or more elements in the set of data elements of the promotion builder document stored in the remote memory.

In some embodiments, the method may further include storing a local copy of the promotion builder document, wherein the visualization of the promotion is generated based on the local copy of the promotion builder document. In such embodiments, the method may further include modifying the local copy of the promotion builder document, and refreshing the visualization in response to modifying the local copy of the promotion builder document. In one such embodiment, modifying the local copy of the promotion builder document comprises modifying one or more data elements of the set of data elements of the local copy of the promotion builder document.

In another such embodiment, the step of transmitting the instructions to modify the one or more elements in the set of data elements is based on the local copy of the promotion builder document.

In some embodiments, generating the visualization of the promotion comprises generating a document based on one or more template recommendations included in the set of data elements, wherein variables from the template recommendations are replaced in the document by corresponding data from one more template selections included in the set of data elements.

In all such embodiments, the remote memory need not be physically co-located with the processor.

In another example embodiment, an apparatus for generating promotions is provided. The apparatus may include a processor and a memory, the memory storing computer program code that, when executed by the processor, causes the apparatus to access a promotion builder document stored in a remote memory, wherein the promotion builder document comprises a set of data elements guiding assembly of a promotion, generate a visualization of a promotion based on the promotion builder document, and transmit instructions to modify one or more elements in the set of data elements of the promotion builder document stored in the remote memory.

In some embodiments, the computer program code, when executed by the processor, further causes the apparatus to store a local copy of the promotion builder document, wherein the visualization of the promotion is generated based on the local copy of the promotion builder document. In such embodiments, the computer program code, when executed by the processor, further causes the apparatus to modify the local copy of the promotion builder document, and refresh the visualization in response to modifying the local copy of the promotion builder document. In one such embodiment, modifying the local copy of the promotion builder document comprises modifying one or more data elements of the set of data elements of the local copy of the promotion builder document.

In another such embodiment, the computer program code, when executed by the processor, causes the apparatus to transmit the instructions to modify the one or more elements in the set of data elements based on the local copy of the promotion builder document.

In some embodiments, generating the visualization of the promotion comprises generating a document based on one or more template recommendations included in the set of data elements, wherein variables from the template recommendations are replaced in the document by corresponding data from one more template selections included in the set of data elements.

In all such embodiments, the remote memory need not be physically co-located with the processor.

In another example embodiment, a computer program product for generating promotions is provided. The computer program product may include a computer-readable storage medium storing computer program code that, when executed by an apparatus, causes the apparatus to access a promotion builder document stored in a remote memory, wherein the promotion builder document comprises a set of data elements guiding assembly of a promotion, generate a visualization of a promotion based on the promotion builder document, and transmit instructions to modify one or more elements in the set of data elements of the promotion builder document stored in the remote memory.

In some embodiments, the computer program code, when executed by the apparatus, further causes the apparatus to store a local copy of the promotion builder document, wherein the visualization of the promotion is generated based on the local copy of the promotion builder document. In such embodiments, the computer program code, when executed by the apparatus, further causes the apparatus to modify the local copy of the promotion builder document, and refresh the visualization in response to modifying the local copy of the promotion builder document. In one such embodiment, modifying the local copy of the promotion builder document comprises modifying one or more data elements of the set of data elements of the local copy of the promotion builder document.

In another such embodiment, the computer program code, when executed by the apparatus, causes the apparatus to transmit the instructions to modify the one or more elements in the set of data elements based on the local copy of the promotion builder document.

In some embodiments, generating the visualization of the promotion comprises generating a document based on one or more template recommendations included in the set of data elements, wherein variables from the template recommendations are replaced in the document by corresponding data from one more template selections included in the set of data elements.

In all such embodiments, the remote memory need not be physically co-located with the processor.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
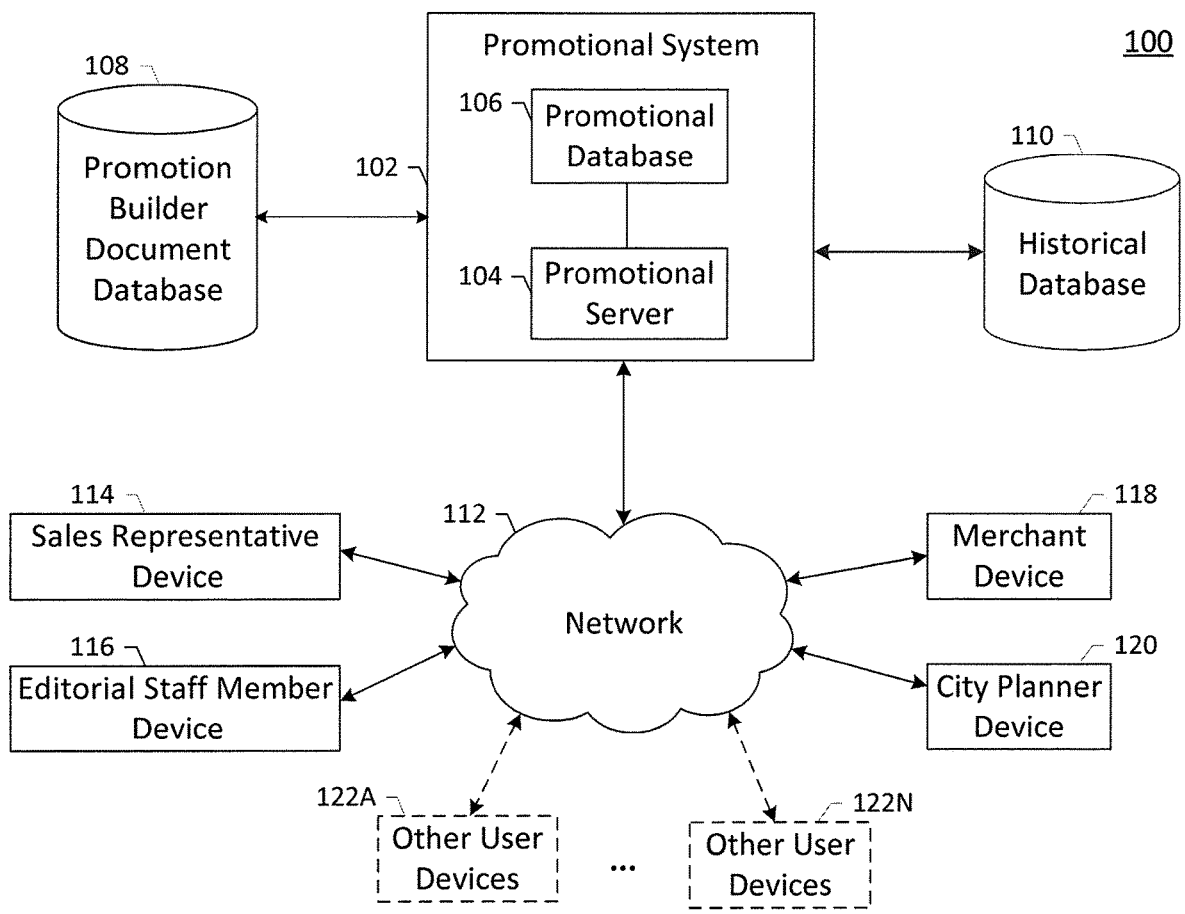
Figure 2:
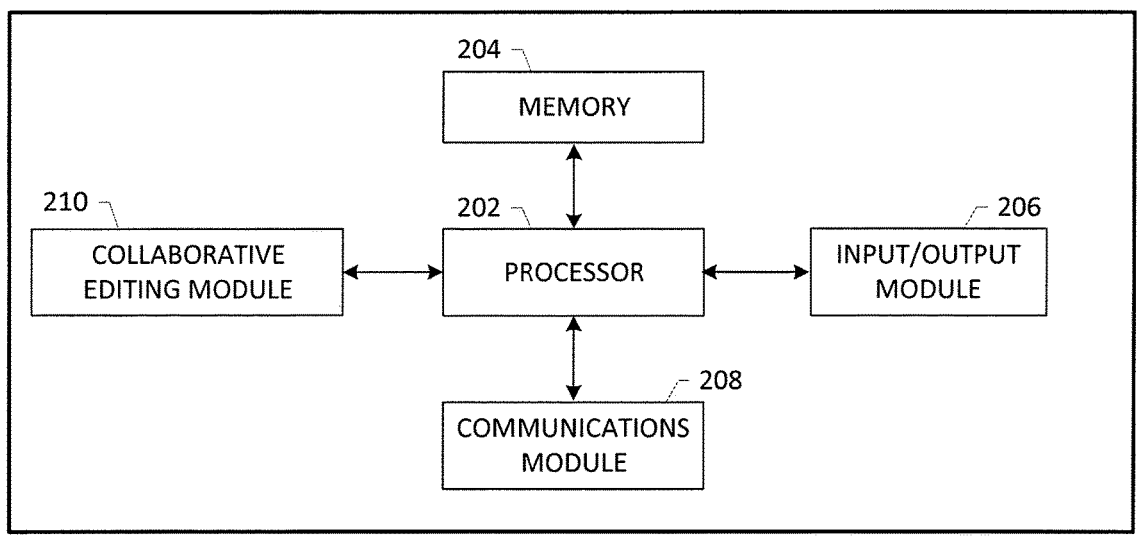
Figure 3:
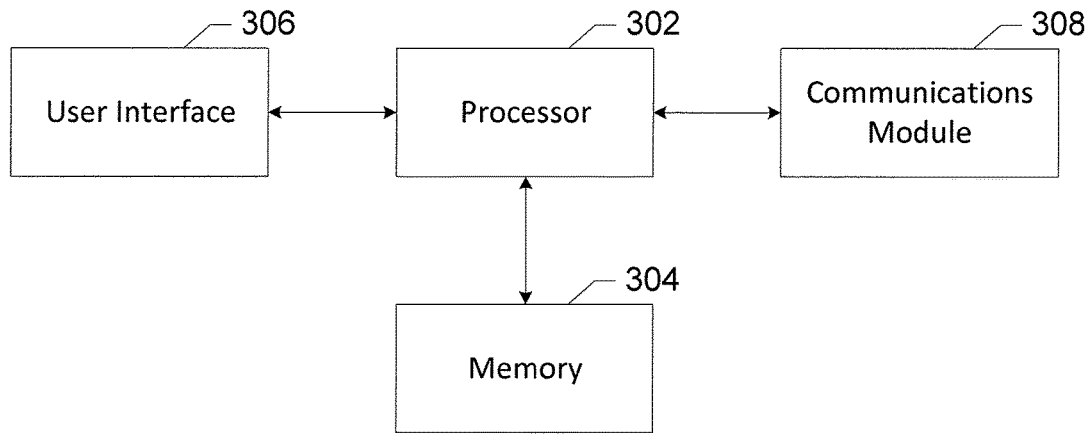
Figure 4:
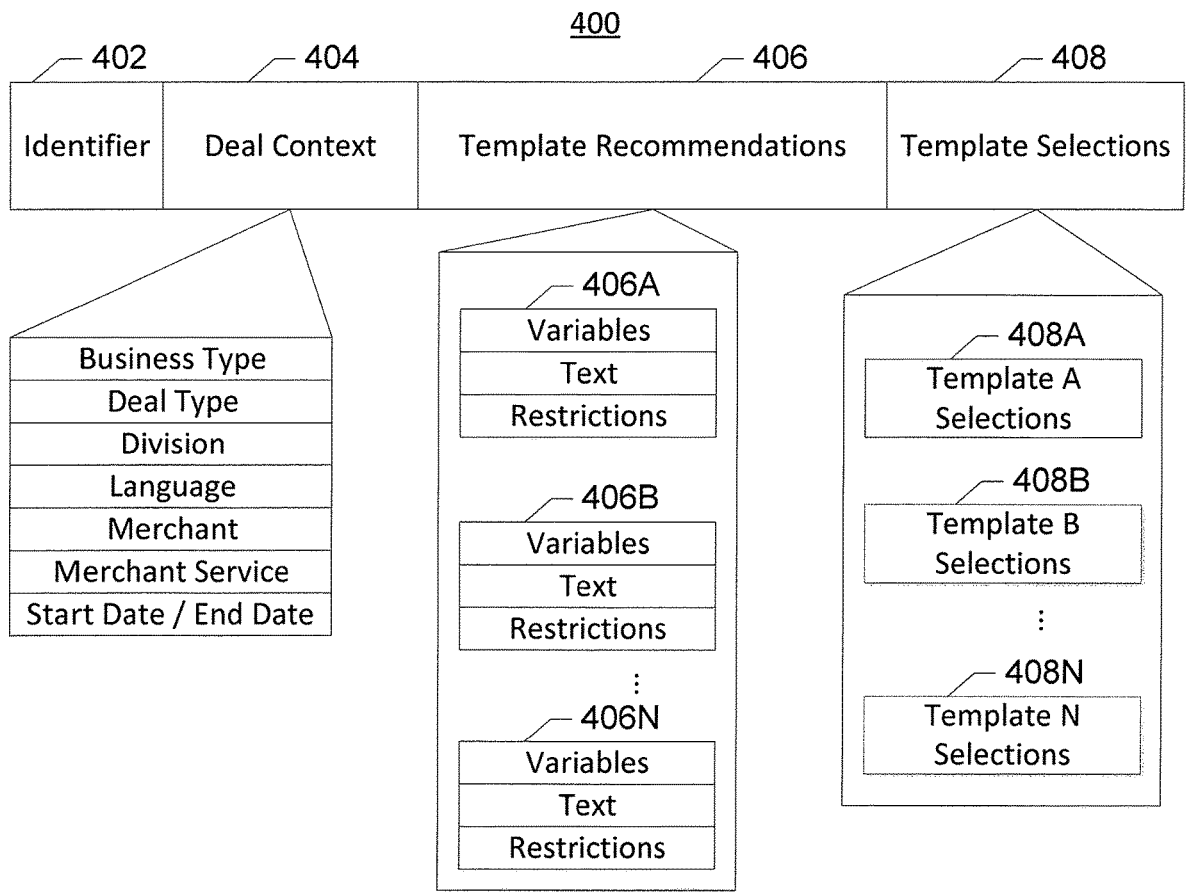
Figure 5:
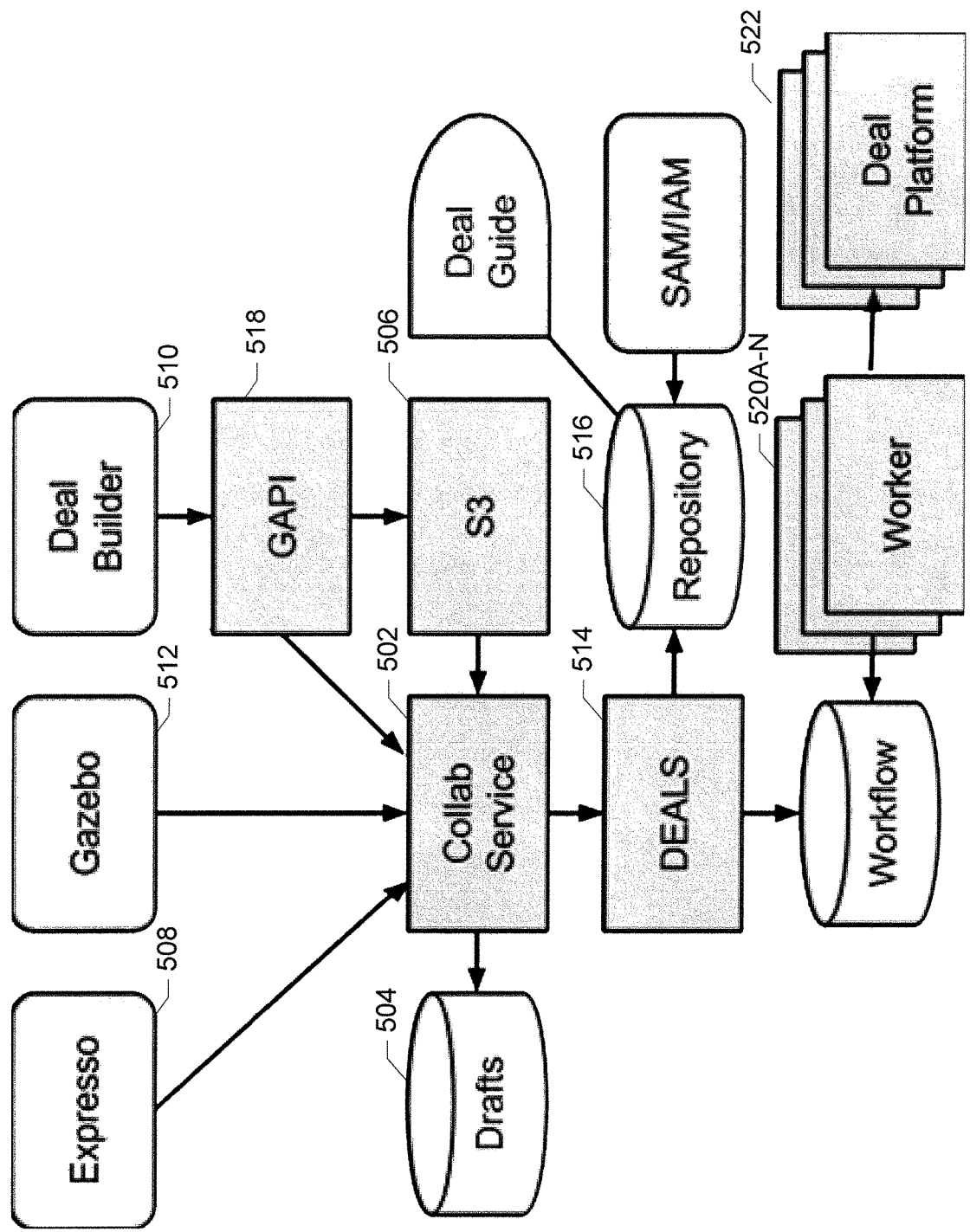
Figure 6:
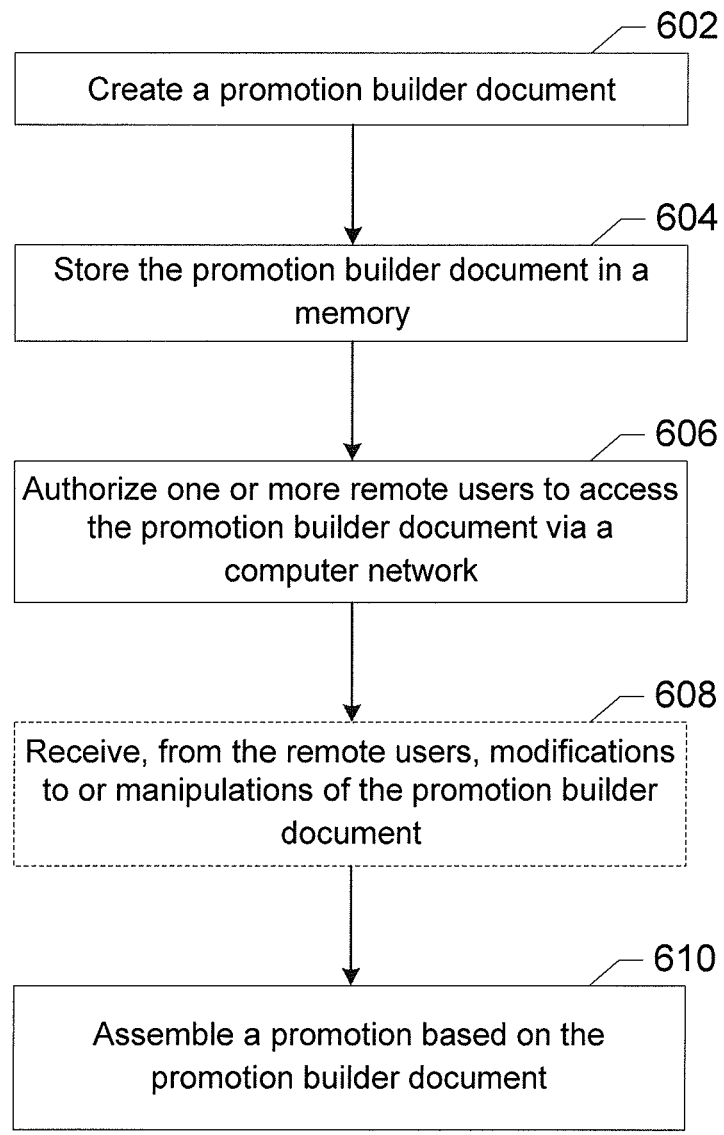
Figure 7:
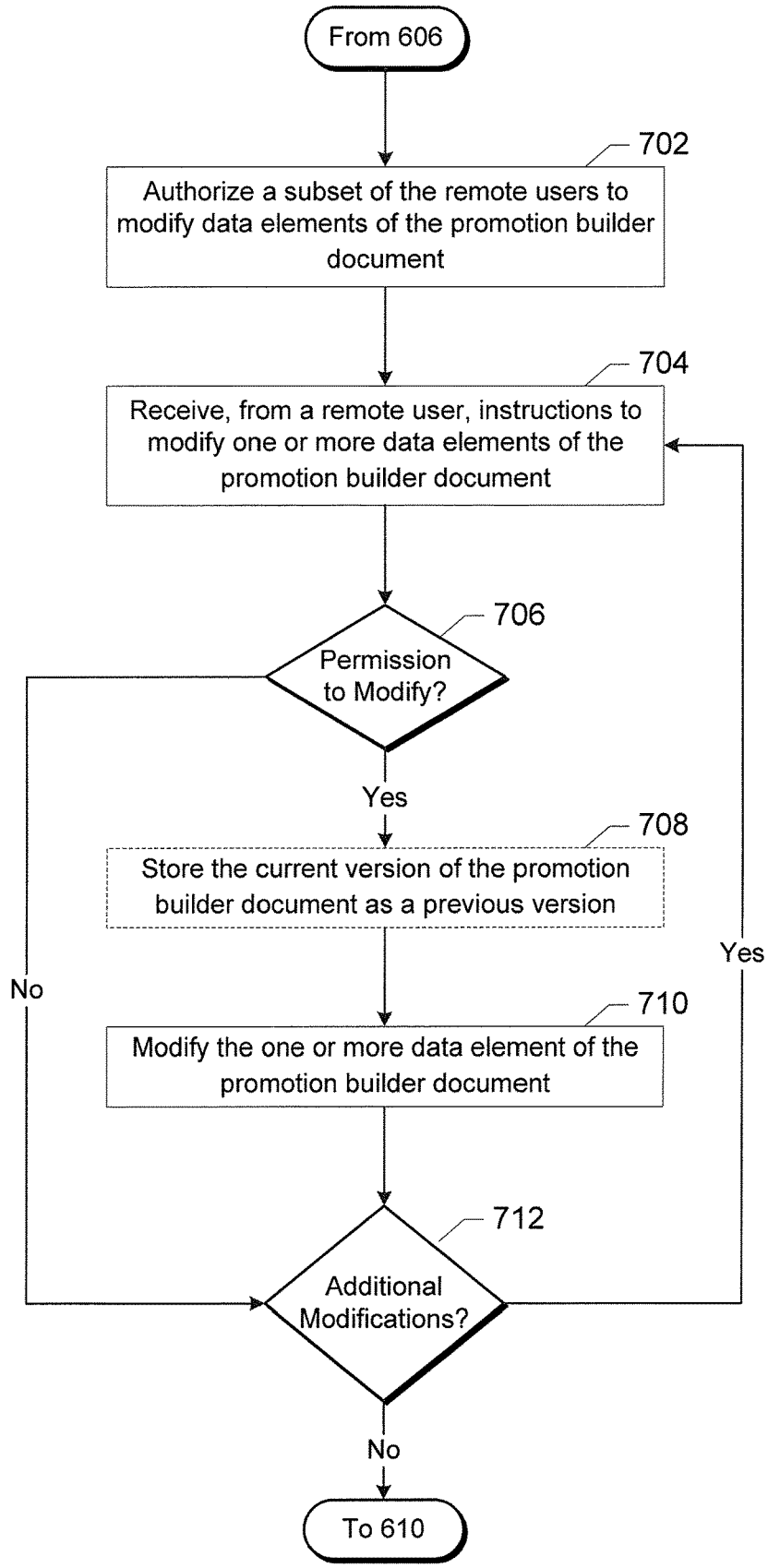
Figure 8:
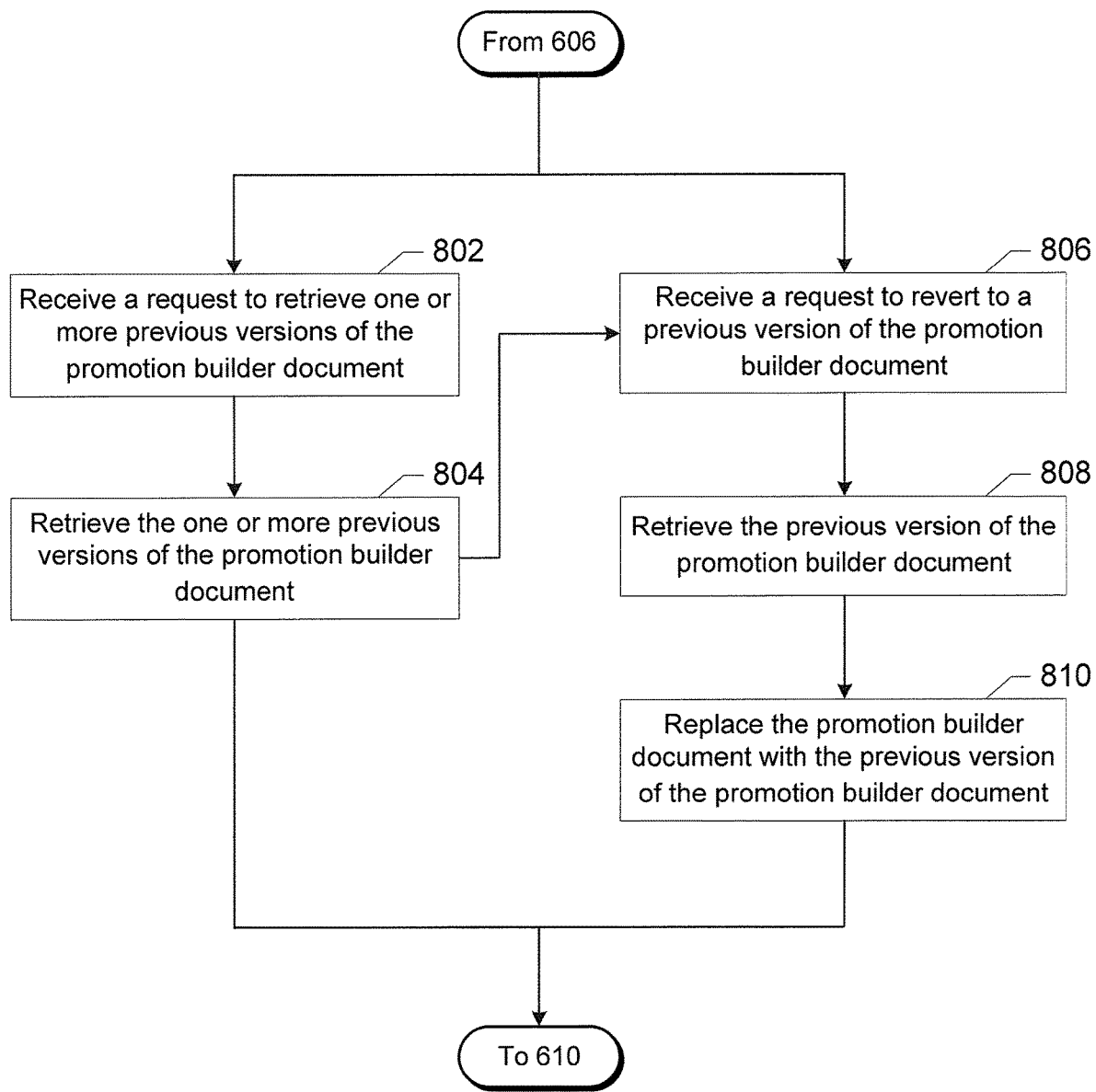
Figure 9:
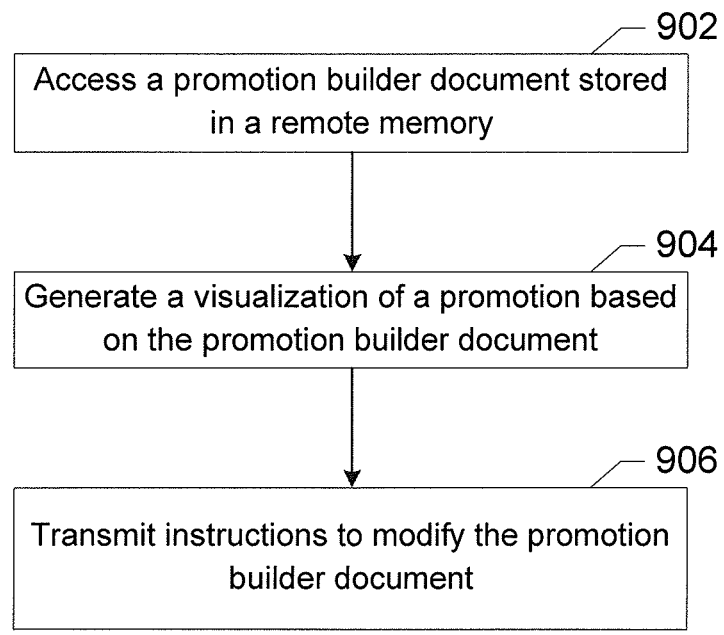

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by one or more collaborators developing a promotion, in accordance with an example embodiment of the present invention;

FIG. 4 illustrates an example set of data elements included in a promotion builder document, in accordance with some example embodiments;

FIG. 5 illustrates a hierarchical diagram, indicating the relationship of the collaborative editing service to other components, in accordance with some example embodiments; and FIG. 6 illustrates a flowchart describing example operations for improving the process of generating promotions from the perspective of a promotion and marketing service, in accordance with some example embodiments;

FIG. 7 illustrates a flowchart describing example operations for modifying a promotion builder document, in accordance with some example embodiments;

FIG. 8 illustrates a flowchart describing example operations for manipulating a promotion builder document, in accordance with some example embodiments; and FIG. 9 illustrates a flowchart describing example operations for modifying a promotion builder document from the perspective of a collaborator, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "fine print" may include parameters (legal or contractual), bounds, considerations and/or the like that outline the term, timing, constraints, limitations, redemption parameters, rules or the like for how and/or when a promotion may be redeemed, and which may also include limitations on liability, conditions for eligibility, warnings, or any other notification that a merchant may desire to place on a promotion. For example, an indication that the promotion must be redeemed prior to a specified deadline, for a specific good, service or experience and/or the like. For example, using the aforementioned running company as the example provider, examples of fine print may be: a limit of one purchase per person; limiting redemption to only physical store locations; or an expiration date of May 29, 2013.

As used herein, the term "editorial content" may include text and/or images related to the promotion. The editorial content may, for instance, describe the particular product or service referenced by the promotion, or may comprise one or more images intended to be broadly descriptive of the promotion. In some embodiments, the editorial content may include fine print for the promotion. For example, using the aforementioned running shoe promotion, the editorial content may comprise a description of the running shoes in question, a stock image of running shoes, or the example fine print described above.

Overview

A method, apparatus, and computer program product are provided in accordance with an example embodiment of the present invention in order to improve the process by which promotions are generated.

Traditional methods for generating promotions may often take days to complete, because each version of a promotion must be transferred, in whole between users, which ensures that no more than a single user is able to modify the promotion at any given time. This delay can potentially reduce the number of merchants interested in partnering with a promotion and marketing service. Moreover, because a draft version of a promotion must be wholly transferred between users for evaluation and modification, these traditional methods often produce scenarios in which multiple users are not able to view consistently similar draft versions of promotions. As a result, these methods for generating promotions can cause confusion and potentially even introduce errors into the generated promotion.

To surmount these and other problems identified with traditional methods of generating promotions, example embodiments of the present invention are shown in which a promotion builder document which includes a set of elements (e.g., an identifier, a deal context, template recommendations, and template selections, as described in greater detail below) is stored in a memory accessible via a communication network by all parties involved in the generation of a corresponding promotion (e.g., the collaborators, who may be sales representatives, editorial content staff, merchants, city planners, customer support staff, or the like). Of these elements, each "template" may include a framework for content to be included in a promotion (e.g., summary, editorial content, fine print, etc.), and the template selections may comprise selections of which templates to use, as well as selections of the content that will be placed into the appropriate spots in the selected template upon assembly of the promotion. During the process of recommending templates and receiving template selections, embodiments of the present invention enable collaborators manipulating promotion builder document to visualize a current version of the promotion or, once agreement has been reached by all parties regarding the set of elements of the promotion, to assemble the completed promotion.

By storing promotion builder documents in a network-accessible memory, embodiments of the present invention enable a parallel collaboration process. To this end, a single promotion builder document may be accessible by all of the users involved in the generation of the promotion at any time. Accordingly, the serialized downtime endemic to traditional methods of generating promotions can be avoided, and the lead-time for generation of a promotion may be reduced by avoiding downtime during transitions between collaborators. Moreover, in an instance in which multiple parties are online, rapid back-and-forth communication can occur that could potentially facilitate the completion of a promotion in a matter of minutes, rather than days.

An additional benefit of storing the promotion builder document in a network-accessible memory is that a consistent presentation of information can be provided to all of the collaborators. In this regard, each collaborator is guaranteed to be viewing a consistently similar visualization (or preview) of a promotion, because all of the visualizations are generated from the same promotion builder document. Moreover, because these visualizations are generated in the same way the promotion is subsequently assembled, there is guaranteed consistency between the visualizations and the resulting promotion.

Embodiments of the present invention accordingly improve the process by which promotions are generated, both by improving the speed with which promotions can be initially created and updated, and by ensuring consistency of visualization by all collaborators involved the promotion generation process. The net result of these changes is the adoption of an improved promotion generation experience for the merchant. As a result, using embodiments of the present invention, the promotion and marketing service may increase its value proposition to prospective merchant partners.

System Architecture

The apparatus of the present invention may be embodied by any of a variety of devices. For example, the apparatus of an example embodiment may be embodied by a networked device, such as a server or other network entity, configured to communicate with one or more devices, such as one or more client devices, to perform methods of the present invention. In one such embodiment, the apparatus may store computer readable instructions that it may operate to perform these methods. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, wearable device, or any combination of the aforementioned devices.

In this regard, FIG. 1 discloses an example computing system within which embodiments of the present invention may operate. Various authors involved in the generation of promotions may access a promotional system 102 via a network 112 (such as the Internet, or the like) using computer devices 114-120, and 122A-N. In this regard, these authors may include sales representatives 114, one or more editorial content staff members 116, a merchant 118, one or more city planners 120, and one or more additional users 122A-122N, as may be relevant to the generation of a particular promotion. Moreover, the promotional system 102 may comprise a promotional server 104 in communication with a promotional database 106. The promotional system may further have access to a promotion builder document database 108 that stores completed promotion builder documents (described in greater detail below), as well as previous versions of each promotion builder document, and a historical database 110 storing historical information regarding previously offered promotions. The promotional system 102 is, in some examples, able to parallelize the generation of promotions, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, and an editorial content module 210, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with example embodiments of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading. In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The collaborative editing module 210 may be used to create and revise promotion builder documents that are in turn used by the promotional system 102 and/or devices 114-122N to visualize or assemble promotions. In this regard, each promotion builder document comprises a set of data elements storing information regarding the various details of a promotion that may be relevant to a particular merchant transaction. The set of elements may include an identifier, a deal context, template recommendations, and template selections, as described in greater detail below. The collaborative editing module 210 enables various service interactions by collaborators generating a promotion. As an initial matter, collaborative editing module 210 enables the creation of a promotion builder document. Similarly, collaborative editing module 210 enables the querying of a promotion builder document database 108 and/or historical database 110 by identifier, which returns a list of identifiers for promotions that satisfy the query. In addition, collaborative editing module 210 enables collaborators to read a promotion builder document via a communication network 112. In this regard, collaborative editing module 210 enables a collaborator to poll promotion builder document database 108 for the index of the latest revisions to a promotion builder document, or to fetch a range of revisions to the promotion builder document. In the latter case, the collaborative editing module 210 may return operational transformations for revisions within the specified range of revision versions. In some embodiments, operational transformations indicate how to modify an existing version of a promotion builder document so that it becomes a new version, but are not themselves new versions of the promotion builder document. As a result, operational transformations are smaller to transmit from remote users via the communication network 112 and enable the creation of a new version of the promotion builder document without needing to scan through the entire promotion builder document. Operational transformations may, in some embodiments, be applied in chronological order to the original document.

As mentioned above, embodiments of the collaborative editing module 210 facilitate the collaborative creation of promotions. This result may be achieved in a number of ways. For instance, in some embodiments collaborative editing module 210 facilitates the parallelization of access and modification of promotion builder documents by storing the promotion builder documents in a networked memory accessible to an array of remote user collaborators. Moreover, in one such embodiment, collaborative editing module 210 provides a system of locks, using which authors may access and modify constituent elements of a promotion builder document without locking the entire document and also without prompting failures that may otherwise be caused by concurrent modification of a single document. In this regard, collaborative editing module 210 enables a collaborator to acquire a lock on an element in a promotion builder document, which freezes the element of the document for a specified period of time (or in some embodiments until the lock is released by the collaborator). After applying a lock, the collaborative editing module 210 enables the collaborator to modify the locked element, by attempting to write an operational transformation into the document. Upon completion of the modification, the collaborator may release the lock. Accordingly, through the use of a system of locks, users are able to access different elements of a promotion builder document concurrently.

Moreover, in some embodiments, collaborative editing module 210 further bolsters the ability to collaborative modify promotions by enabling the generation of visualizations of the promotion builder document by the collaborators who have access to the promotion builder document. These visualizations enable a consistent presentation of drafts of the promotion to each respective collaborator. In this regard, the merchant may be presented with a consistent preview of the promotion, even if the merchant is not able to view or modify every constituent element of the promotion builder document). In a similar fashion, collaborative editing module 210 facilitates the actual building of a promotion, which occurs in a similar fashion as the visualization, and is based on the constituent elements of the promotion builder document, described in greater detail below.

In some embodiments, a collaborator may use the apparatus 200 to participate in the generation of promotions in accordance with example embodiments of the present invention. In other embodiments, the collaborator in question has a separate device is not co-located with the promotional system 102, such as, for example, remote user devices 114-120, and 122A-N. Collaborators may hereinafter be referred to in some instances as remote users in instances in which they interact with the apparatus 200 via a communication network from a separate apparatus 300.

Referring now to FIG. 3, a block diagram is illustrated showing an example apparatus 300 that may be configured to enable a user to interact with the collaborative editing service from outside the promotional system 102, in accordance with embodiments of the present invention.

In FIG. 3, the apparatus 300 may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading. In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Promotion Builder Document

As discussed previously, embodiments of the present invention enable improved generation of promotions through the use of promotion builder documents. Turning now to FIG. 4, a set of data elements 400 is illustrated that may be included in a promotion builder document. The set of data elements may include the requisite information needed to visualize and/or assemble a promotion. In some embodiments the promotion builder document may comprise a single file containing a set of data elements 400, and in this regard may be manipulated by collaborators and used for visualization and/or assembly as described below. In other embodiments, however, the promotion builder document comprising the set of data elements 400 need not be a single file, and each data element of the set 400 can be stored separately (e.g., as a linked list or other such data structure).

In any event, the set of data elements 400 guide assembly of a promotion. To generate a promotion, collaborators may access, and in some cases modify, individual elements of the set of data elements 400 included in a promotion builder document. Notably, the promotion builder document, and in turn the set of data elements 400 stored therein, can be used to generate a visualization of what the resulting promotion would look like given the current data stored in the promotion builder document. Similarly, the promotion builder document may be used, after the conclusion of modification by all collaborators, to assemble the completed promotion. In this regard, the promotion builder document comprises a framework set of data elements 400 comprising the set of elements used to actually generate a completed promotion.

To this end, in an example embodiment, the set of data elements 400 includes four separate elements of information. A first element, 402, comprises an identifier or the promotion builder document (e.g., a universal unique identifier, often referred to as a UUID), which is generated upon creation of the promotion builder document, and which enables the various collaborators to locate the document with particularity. In some embodiments, this identifier is immutable.

A second element, 404, may comprise the deal context to be used for assembly of the promotion (note that through this description, a "deal" is another term for describing a promotion). The deal context itself comprises a data structure containing a collection of parameters. Accordingly, when a deal context is an element of a promotion builder document, this indicates the existence of the deal context data structure that is stored either within a separate document, or otherwise associated with the set of data elements 400, such that the deal context can be used to visualize or assemble a promotion. An example deal context 404 is illustrated by the pop-out diagram of the deal context 402 in FIG. 4 and described below.

The constituent elements of the deal context data structure may include the following parameters:
- (i) a "Business Type," which may indicate a taxonomy for the type of merchant running a promotion;
- (ii) a "Deal Type," which may indicate the channel for the promotion (e.g., (1) goods sold through retail; (2) concerts, shows and sporting events; (3) daily promotions sent by e-mails to subscribers; (4) grassroots philanthropy promotions; (5) real-time, location-based deals that are purchased and redeemed the same day; (6) deals when shopping at local businesses using payment instruments registered with the promotion and marketing service; and (7) getaways);
- (iii) a "Division," which may correspond to a metropolis and its surrounding suburbs;
- (iv) a "Language," which may specify the language of the document into which a recommendation will be inserted;
- (v) a "Merchant," which may specify a merchant UUID for the merchant who is offering the corresponding promotion;
- (vi) a "Merchant Service," which may specify the taxonomy UUID for the primary merchant service offered by the promotion; and
- (vii) a start date and end date of the promotion.

As an example deal context, consider a photographer who specializes in portraiture in Portland, Oreg., and works with the promotion and marketing service to develop a promotion for engagement photography from Oct. 21, 2013 through Nov. 13, 2013. The deal context for this promotion may include the following:

deal_type: G1
division_id: Portland
language: en
merchant_service: 260abdd7-e3f0 (symbolizing engagement photography)
start_date: 2013-10-21
end_date: 2013-11-13

Returning to FIG. 4, a third element of the set of data elements 400 comprises a set of template recommendations 406.

As shown in FIG. 4, the set of template recommendations 406 may include any number of templates 406A through 406N. These recommendations provide the guide posts identifying the outer boundaries of an acceptable promotion, and may be extracted from a database of generated promotions (e.g., promotional database 106, promotion builder document database 108, or historical database 110, or repository 516, shown in FIG. 5). Each template is a generalized version of a piece of editorial content in which variables are substituted for the language that might otherwise be specific to a particular promotion, with the intention that specific editorial content can be selected for these variables in accordance with the deal context and the agreement of the collaborators. Templates may be retrieved from repository 516 and recommended for the promotion builder document by a Deal Assembly Line Service (e.g., DEALS 514, shown in FIG. 5, which illustrates an example of an editorial content service, as described in greater detail in U.S. patent application Ser. No. 14/103,290, referenced above). However, only those templates that are consistent with the deal context 404 are available for recommendation. In general, each of templates 406A through 406N may include some number of variables, some amount of prepared text, and a set of restrictions on the use of the template, and thus the templates provide schemas that describe the inputs needed to perform their operations. They also contain a preview that visualizes the operation for a set of inputs. The inclusion of the templates enables authors to remotely interact with the document. Their persistence (e.g., the fact that the templates remain in existence via storage within the promotion builder document in memory 204, which in some embodiments corresponds to promotion builder document database 108) also ensures that the authors of a promotion builder document are interacting with a consistent version of the templates.

For background, a promotion may be comprised of several types of editorial content, such as editorial copy, images, humor, terms and fine print. This editorial content may be parameterized, and because promotion content often differs only by small variables, such as the price or the name of the merchant, templates are formed with parameters for these variables. For instance, one example piece of editorial content may recite:

50% Off Italian Food at Ristorante Ting

Once parameterized, the corresponding template may be:

[discount-percentage]% Off Italian Food at [merchant-name]

The original content can be recreated by passing the parameters:

discount-percentage=50
merchant-name=Ristorante Ting

Moreover, once the variable aspects of the content are understood, restrictions are added to ensure the substitutions make logic sense. Consider the following piece of editorial content:

$22 for $40 Worth of Italian Food at Ristorante Ting (45% Off)

Once parameterized, the template looks like:

$[unit-price] for $[unit-value] Worth of Italian Food at [merchant-name] ([discount-percent]% Off)

Restrictions such as these can be applied:

unit-price>0
unit-value>unit-price
discount-percent=100−(unit-price/unit-value)*100
discount-percent>0
discount-percent<100

Returning to FIG. 4, another element of the deal context comprises template selections 408. These selections comprise selections 408A through N of the recommended templates 406A through N to be used in the promotion, as well as the identifiers and inputs of each of the selected templates. As will be described in greater detail below, assembly of a promotion will replace variables (parameters) in the template recommendations with identifiers and inputs from the template selections.

Given this explanation of the various elements contained in a promotion builder document, and the above description of an example system configuration using which embodiments of the present invention may be practiced, a description of various operations that may be performed in accordance with the present invention will be described below.

Promotion Visualization and Assembly

As described above, embodiments of the present invention enable the creation of promotion builder document. Using a promotion builder document, collaborative editing module 210 further bolsters collaborators' ability to modify promotions by enabling the generation of visualizations of the promotion builder document. These visualizations enable a consistent presentation of drafts of the promotion to each respective collaborator. In this regard, the merchant may be presented with a consistent preview of the promotion, even if the merchant is not able to view or modify every constituent element of the promotion builder document). In a similar fashion, collaborative editing module 210 facilitates the actual assembly of a promotion, which occurs in a similar fashion as the visualization, and is based on the constituent elements of the promotion builder document, described in greater detail below.

The generation of visualizations and the assembly of a promotion are similar processes. One distinction between the two is that the visualizations are generated and presented to a collaborator via the collaborator's device 300. In this regard, by storing a local copy of the promotion builder document, the collaborator's device 300 may pre-fetch the logic needed to both validate and visualize recommended content. As a result, when the inputs of a template are modified by the collaborator, the collaborator's device 300 is able to render the visualization without a round trip to the promotional system 102.

In turn, rendering the preview client-side makes the visualization more responsive (e.g., by reducing latency) and insulates the collaborator's device 300 from network interruptions. Additionally, the modifications made by the collaborator may be transmitted back to the promotional 102 asynchronously in the background, and therefore also need not impact the latency of these local interactions. In contrast to local visualization by collaborators, assembly of a promotion may be performed by promotional system 102 at the conclusion of all modifications. The promotion may then be stored in a networked memory, such as promotional database 104 or repository 516 (shown in FIG. 5), for use by the promotion and marketing service.

In both cases, the process of generating the visualization or promotion starts from an analysis of the promotion builder document. The template recommendations 406 of a promotion builder document establish the framework for a promotion. To transform these templates into real-world editorial content, the template suggestions 408 of the promotion builder document are inserted as appropriate. As a first operation, the template selections identify which of the templates 406A through N will be used in a particular framework (note that although many templates may be suggested, the promotion may include only some subset of these suggestions). Subsequently, in one embodiment, variables in the selected templates may be replaced with data from corresponding template selections 408A through 408N. While there may be multiple templates 406A through 406N and multiple template selections 408A through 408N, there will typically be fewer selections than recommendations, although this need not be an absolute requirement. In this regard, template recommendations 406 comprise the set of possible templates that can be used. For example: (A) Up to [discount-percent] off Shellac Manicures; (B) Up to [discount-percent] Off at [merchant-name]; (C) [discount-percent] Off Mani-Pedis at [merchant-name]. The recommendations may also have facets that restrict the possible values for these placeholders, as described above. For most aspects of a deal, only one recommendation will be selected (e.g., using Recommendation (B) with [discount-percent]=58%; [merchant-name]="Groupon Nails and Spa"). In this case, (A) and (C) were recommended, but not selected. The eventual deal will say "Up to 58% Off at Groupon Nails and Spa".

Collaborative Editing Service

Turning now to FIG. 5, a diagram is illustrated of the operative environment within which the collaborative editing service is employed. As shown in FIG. 5, collaborative editing service 502 comprises a major focal point of the promotion generation process. Similarly, the promotion builder documents generated by the collaborative editing service, and different versions thereof, may be stored as drafts 504 by the collaborative editing service. However, as can be seen in FIG. 5, the collaborative editing service 502 comprises a mid-stream component.

Inputs to the collaborative editing service 502 come from several sources. The Self-Service Service 506 (S3) provides pre-approved templates for use in the collaborative editing service 502, which in turn may be taken from a database storing the templates, or may be scraped from existing promotions stored in a repository 516. The Expresso service 508 is a GUI for sales representatives, who typically select a deal structure and fine print. Deal Builder 510 is a GUI for merchants, who typically select an image, frequently asked questions, and copy for a promotion. Gazebo 512 is a GUI for Editorial staff, who typically proofread the inputs from Deal Builder 510. The inputs may correspond to template selections. The collaborative editing service 502 may in some embodiments be behind a firewall, while the Deal Builder 510 is outside the firewall (so it can be used by external merchants). An Application Programming Interface (e.g., GAPI 518) provides secure access through the firewall.

Downstream of the collaborative editing service 502 is the DEALS service 514 and repository 516. After creating and revising a promotion builder document, the collaborative editing service may assemble a promotion based thereon, as will be described in greater detail below, and the completed promotion may be stored in repository 516. In this regard, once the draft is finalized, it is committed to the Deal Assembly Line Service (DEALS) 514. This tool is configured to determine the steps needed to populate the promotion and market service's website with selected templates. It writes the necessary tasks into the Workflow database. Each template requires several steps to produce the final text.

The workers 520A through 520N are specialized programs that perform specific tasks asynchronously. They typically collect data needed to compile the promotion and write the eventual content to the middle tier behind the promotion and marketing service's website. The Deal Platform 522 may comprise tools like Deal Catalog, Image Service, Salesforce (third-party), Voucher Inventory Service, etc. whose interaction with the promotion is beyond the scope of this description.

Turning now to FIG. 6, example operations for improving the process of generating promotions are illustrated from the perspective of a promotion and marketing service. The operations illustrated in FIG. 6 may, for example, be performed by the promotional system 102 (e.g., promotional server 104), with the assistance of, and/or under the control of one or more devices, such as apparatus 200, and may use processor 202, memory 204, input/output module 206, communications module 208, and collaborative editing module 210. For context, a collaborator (e.g., a remote user) may initiate or participate in the generation of a promotion.

In operation 602, the apparatus 200 includes means, such as processor 202, collaborative editing module 210, or the like, for creating a promotion builder document. As noted previously, a promotion builder document may comprise a set of data elements guiding assembly of a promotion. It should be noted that operation 602 may be prompted by instructions received from a remote user (e.g., users 114-122N) via a device 300. In any event, in some embodiments the creation of a promotion builder document generates an empty document having only an identifier, and if generation of the promotion builder document was prompted by a third party apparatus 300, the identifier is returned to the apparatus 300 prompting generation of the promotion builder document. In other embodiments, it's possible that a promotion builder document, at creation, also includes data regarding its deal context 404, template recommendations 406, and even possibly template selections 408, if such data is provided by the collaborator requesting creation of the promotion builder document.

In operation 604, the apparatus 200 includes means, such as memory 204 or the like, for storing the promotion builder document in a memory connected to a communication network. In this regard, the communication network may be wired or wireless, but provides the collaborators with access to the memory, even though they may not be co-located with the memory.

Accordingly, in operation 606, the apparatus 200 includes means, such as processor 202, input/output module 206, communications module 208, collaborative editing module 210, or the like, for authorizing one or more remote users to access, via the computer network, the promotion builder document. As noted above, the communication network provides access to the promotion builder document to the remote users so that they can transmit instructions and receive data regarding the promotion builder document.

In some embodiments of the present invention, detailed in operation 608, the apparatus 200 may include means, such as input/output module 206, communications module 208, collaborative editing module 210, or the like, for receiving, from the remote users, modifications to or manipulations of the promotion builder document. The nature of these modifications and manipulations will be described in greater detail below in association with FIGS. 7 and 8, respectively.

Finally, in operation 610, the apparatus 200 includes means, such as processor 202, collaborative editing module 210, or the like, for assembling a promotion based on the promotion builder document. In this regard, assembling the promotion may include producing a text string based on templates represented by the one or more template recommendations, wherein variables from the represented templates are replaced in the text string by corresponding data from the one more template selections in accordance with the promotion context. In this regard, the apparatus 22 assembles a promotion (and/or visualizes a promotion) in a manner consistent with that described previously.

Turning now to FIG. 7, example operations for modifying a promotion builder document are illustrated from the perspective of a promotion and marketing service. The operations illustrated in FIG. 7 may, for example, be performed by the promotional system 102 (e.g., promotional server 104), with the assistance of, and/or under the control of one or more devices, such as apparatus 200, and may use processor 202, memory 204, input/output module 206, and communications module 208. For context, a collaborator may initiate or participate in the modification of a promotion builder document.

In operation 702, the apparatus 200 includes means, such as memory 204, input/output module 206, communications module 208, collaborative editing module 210, or the like, for authorizing a subset of the remote users to modify data elements of the promotion builder document. This operation may occur following the access authorization described in operation 606 above or may be or coterminous therewith. As noted previously, a promotion builder document may comprise a set of data elements guiding assembly of a promotion. Accordingly, in some example embodiments, this authorization provides the subset of the remote users with the authority to modify one or more of the data elements included in the promotion builder document. In one such embodiment in which multiple remote users are included in the subset, authorizing a subset of the remote users to modify one or more data elements of the promotion builder document involves providing at least one of the remote users in the subset with the authority to modify a different combination of data elements of the promotion builder document than the remaining remote users in the subset. In other words, it is not necessary for each user to have coextensive authority to modify the promotion builder document.

Furthermore, the nature of the authorizations provided to each user may be dependent upon the role each user plays in generating a promotion. While there is a single copy of the promotion builder document stored in memory, the collaborators each have different exposure and access rights to the set of configurable elements of the promotion builder document, based on their respective roles in generation of a promotion. Thus, some embodiments of the present invention present an authorization model based on role-based access control (RBAC). However, in some embodiments the process for creating and revising a promotion builder document is not strictly structured, and in these embodiments the division of labor is left to the discretion of the collaborators. Accordingly, it may be possible for the various collaborators (e.g., sales representatives, editorial staff, city planners, customer support staff, or the like) to play larger or smaller roles depending on the circumstances surrounding creation of an individual promotion builder document.

In any event, the recommended templates can be filtered by collaborator. For instance, a merchant may not have access to templates that have not been pre-approved. Similarly, in some embodiments the recommended templates may only be relevant to a deal context that has already been prepared.

In another embodiment, the contents of the promotion builder document may also be faceted. For instance, while merchants may see a fixed margin (e.g., the percentage of the purchase price of a promotion that is retained by the merchant with respect to the promotion and marketing service) upon reviewing a template, the schema presented to a sales representative may comprise a range of acceptable margins. Procedures for providing a faceted display may be implemented in any of a number of ways. Each template may comprise a data structure storing multiple sets of information, each set viewable by a different collaborator based on the above-described access rights. Alternatively, there may be multiple templates used to produce this result. As yet another alternative mechanism for producing this result, the data contained in a template may be transformed by the collaborative editing module 210 prior to being viewable by a user, during which inappropriate content for a particular collaborator may be scrubbed.

Returning now to FIG. 7, in operation 704 the apparatus 200 includes means, such as memory 204, input/output module 206, communications module 208, or the like, for receiving instructions from a remote user to modify one or more data elements of the promotion builder document.

In operation 706, the apparatus 200 includes means, such as processor 202, collaborative editing module 210, or the like, for determining whether the remote user has the authority to modify the one or more data elements of the promotion builder document. As noted above, embodiments of the present invention may provide access and modification authorizations based on the roles of the various collaborators. Accordingly, while a particular collaborator may have authority to modify some data elements of a promotion builder document, in some embodiments of the present invention it is not necessarily the case that the collaborator has the authority to modify the particular data element in question here. In an additional embodiment, the modification authorization may be even more granular, in that a particular remote user may be authorized to modify a data element in some ways, but not in other ways. For example, while a merchant may be authorized to modify the discount associated with a template recommendation (by providing a respective template selection), the merchant might not be authorized to modify a margin associated with the template recommendation. If the remote user is authorized to modify the one or more data elements, then the procedure moves on to operation 708. However, if the remote user does not have authority to modify the one or more data elements, then the procedure moves on to operation 712, described below.

In some embodiments of the present invention, detailed in operation 708, the apparatus 200 may include means, such as processor 202, memory 204, collaborative editing module 210, or the like, for storing the existing version of the promotion builder document as a previous version of the promotion builder document. This operation may be an option in embodiments including history tracking features. In such embodiments, by saving the promotion builder document every time a modification will be made, changes to the promotion builder document are never lost, and the collaborators are able to review, and in some instances revert back to, different states of the promotion builder document, as will be described in greater detail in association with FIG. 8 below.

In operation 710, the apparatus 200 includes means, such as processor 202, memory 204, collaborative editing module 210, or the like, for modifying the one or more data elements of the promotion builder document in accordance with the request received from the remote user in operation 704. While modifications to the template recommendations 406 or template selections 408 may simply change the data stored in the set of data elements, modifications to the deal context provide other cascading effects. In this regard, once the deal context has been added to the promotion builder document, template recommendations that can form a comprehensive promotion are available for selection only insofar as they are in accordance with the deal context. However, after adding a deal context to the promotion builder document, the collaborators may be working off of a functional deal, so modifications to elements of the promotion builder document may be immediately validated and communicated back to other parties and ensure that none of the collaborators head too far down the wrong path.

Finally, in operation 712, the apparatus 200 includes means, such as processor 202, collaborative editing module 210, or the like, for determining whether any additional modifications have been requested by any of the collaborators. If additional modifications have been requested, the procedure returns to operation 704. If not, the procedure returns to the functionality described in association with operation 610, above.

Turning now to FIG. 8, example operations for manipulating a promotion builder document are illustrated from the perspective of a promotion and marketing service. The operations illustrated in FIG. 8 may, for example, be performed by the promotional system 102 (e.g., promotional server 104), with the assistance of, and/or under the control of one or more devices, such as apparatus 200, and may use processor 202, memory 204, input/output module 206, and communications module 208. In some embodiments, collaborators/remote users may initiate or participate in the manipulation of a promotion builder document.

In operation 802, the apparatus 200 includes means, such as memory 204, input/output module 206, communications module 208, collaborative editing module 210, or the like, for receiving a request to retrieve one or more previous versions of the promotion builder document. The request may be received from any of the remote users authorized to access elements of the promotion builder document. This operation may occur following the access authorization described in operation 606 above or may be or coterminous therewith.

In operation 804, the apparatus 200 includes means, such as processor 202, memory 204, input/output module 206, communications module 208, collaborative editing module 210, or the like, for retrieving the requested one or more previous versions of the promotion builder document. In some embodiments, the previous versions may be desired by a remote user to inform a potential request to modify the promotion builder document. However, it may be the case that no further modifications are desired after this review. In such a situation, the procedure returns to operation 610, described previously.

Alternatively, in operation 806, the apparatus 200 includes means, such as memory 204, input/output module 206, communications module 208, collaborative editing module 210, or the like, for receiving a request to revert to a previous version of the promotion builder document. In this regard, operation 806 may be prompted by the retrieved previous versions retrieved in operation 804. However, in another embodiment where a remote user already has sufficient information regarding the previous versions of the promotion builder document, this operation may occur independently at any time following the access authorization described in operation 606, or may even be coterminous therewith.

In operation 808, the apparatus 200 includes means, such as memory 204, input/output module 206, communications module 208, collaborative editing module 210, or the like, for retrieving the specific previous version to which reversion was requested. While operation 804 describes the retrieval of a range of previous versions, this operation describes the retrieval of an individual previous version. Furthermore, because operation 806 need not follow operation 804, operation 808 may be required to produce the version of the promotion builder document to which reversion has been requested. Of course, in an embodiment in which operation 804 produced the previous version requested, it may not be necessary to separately invoke operation 808.

Finally, in operation 810, the apparatus 200 includes means, such as memory 204, input/output module 206, communications module 208, collaborative editing module 210, or the like, for replacing the promotion builder document with the previous version of the promotion builder document requested in operation 806. Subsequently, the procedure may return to operation 610 for further processing, as described above.

Turning now to FIG. 9, example operations are illustrated from the perspective of a remote user collaborator. The operations illustrated in FIG. 9 may, for example, be performed by a sales representative device 114, editorial staff member device 116, merchant device 118, city planner device 120, or any other user device 122A through 122N, with the assistance of, and/or under the control of one or more devices, such as apparatus 300, and may use processor 302, memory 304, user interface 306, and communications module 308.

In operation 902, the apparatus 300 includes means, such as processor 302, communications module 308, or the like, for accessing a promotion builder document. As noted previously, a promotion builder document may comprise a set of data elements guiding assembly of a promotion. To this end, the apparatus 300 may in some embodiments include means, such as processor 302, memory 304, or the like, for storing a local copy of the promotion builder document. In this regard, the remote memory need not be physically co-located with the processor.

In operation 904, the apparatus 300 includes means, such as processor 302 or the like, for generating a visualization of a promotion based on the promotion builder document. In some embodiments, the visualization of the promotion is generated based on the local copy of the promotion builder document.

Moreover, in some embodiments, the apparatus 300 may include means, such as processor 302, memory 304, or the like, for modifying the local copy of the promotion builder document. In such embodiments, the apparatus 300 may further include means, such as processor 302, user interface 306, or the like, for refreshing the visualization in response to modifying the local copy of the promotion builder document. Moreover, in some such embodiments, modifying the local copy of the promotion builder document may include modifying one or more data elements of the set of data elements of the local copy of the promotion builder document. In other such embodiments, the step of transmitting the instructions to modify the one or more elements in the set of data elements is based on the local copy of the promotion builder document.

In at least one embodiment, visualization of the promotion occurs in a similar manner as assembly of a promotion. As such, in such an embodiment, generating the visualization of the promotion includes generating a document based on one or more template recommendations included in the set of data elements, wherein variables from the template recommendations are replaced in the document by corresponding data from one more template selections included in the set of data elements.

Finally, in operation 906, the apparatus 300 includes means, such as processor 302, communications module 308, or the like, for transmitting instructions to modify the promotion builder document. As noted above, the communication network provides access to the promotion builder document to the remote users so that they can transmit instructions and receive data regarding the promotion builder document.

Embodiments of the present invention accordingly improve the process by which promotions are generated, both by improving the speed with which promotions can be initially created and updated, and by ensuring consistency of visualization by all collaborators in the promotion generation process. The net result of these changes is the adoption of an improved promotion generation experience for the merchant. As a result, using embodiments of the present invention, the promotion and marketing service may increase its value proposition to prospective merchant partners.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for generating promotions which allows a plurality of remote users to view a consistent version of a promotion, comprising:

accessing a promotion builder document that is stored in a remote memory, wherein the promotion is a deal indicative of a promotional value that upon purchase or acceptance results in issuance of an instrument configured to be used toward at least a portion of purchase of at least one of a particular good, service, or experience defined by the promotion, the promotion configured to be electronically transmitted to subscribers, wherein the promotion builder document comprises a framework set of data elements configured to guide assembly of the promotion, the framework set of data elements including:

a unique identifier enabling the plurality of remote users to access the promotion builder document; and a set of template recommendations extracted from a database, each template recommendation of the set of template recommendations comprising a generalized piece of editorial content comprising a variable configured as a placeholder for a promotion-specific content element;

storing a local copy of the promotion builder document in a local memory, wherein storing includes storage of an identification of potential components of a template promotion and a selection of a subset of the potential components of the template promotion forming a final promotion;

generating, by a processor, a visualization of the promotion based on the local copy of the promotion builder document, wherein generating the visualization includes generating a document comprising a text string based on a subset of the set of template recommendations in which the variables for the subset of the set of template recommendations are replaced in the text string by corresponding data from a set of template selections, and wherein the plurality of remote users are authorized by the processor to manipulate the promotion builder document and visualize a current version of the promotion; and transmitting asynchronously received instructions to modify one or more data elements in the framework set of data elements of the promotion builder document that is stored in the remote memory, including transmitting first instructions from a first remote user to modify one or more first data elements in the framework set of data elements and second instructions from a second remote user to modify one or more second data elements in the framework set of data elements, the first instructions and the second instructions comprising instructions received asynchronously from the first remote user and the second remote user, respectively.

2. The computer-implemented method of claim 1, further comprising:

modifying the local copy of the promotion builder document; and refreshing the visualization in response to modifying the local copy of the promotion builder document.

3. The computer-implemented method of claim 2, wherein modifying the local copy of the promotion builder document comprises modifying one or more data elements of the framework set of data elements of the local copy of the promotion builder document.

4. The computer-implemented method of claim 2, wherein the step of transmitting the instructions to modify the one or more data elements in the framework set of data elements is based on the local copy of the promotion builder document.

5. The computer-implemented method of claim 1, wherein the variables from the template recommendations are replaced in the document by the corresponding data from one or more template selections included in the framework set of data elements.

6. The computer-implemented method of claim 1, wherein the remote memory is not physically co-located with the processor.

7. The computer-implemented method of claim 1, further comprising providing different access rights for the framework set of data elements to the first remote user and the second remote user.

8. An apparatus for generating promotions which allows a plurality of remote users to view a consistent version of a promotion, the apparatus comprising a processor and a memory, the memory storing computer program code that, when executed by the processor, causes the apparatus to:

access a promotion builder document that is stored in a remote memory, wherein the promotion is a deal indicative of a promotional value that upon purchase or acceptance results in issuance of an instrument configured to be used toward at least a portion of purchase of at least one of a particular good, service, or experience defined by the promotion, the promotion configured to be electronically transmitted to subscribers, wherein the promotion builder document comprises a framework set of data elements configured to guide assembly of the promotion, the framework set of data elements including:

a unique identifier enabling the plurality of remote users to access the promotion builder document; and a set of template recommendations extracted from a database, each template recommendation of the set of template recommendations comprising a generalized piece of editorial content comprising a variable configured as a placeholder for a promotion-specific content element;

store a local copy of the promotion builder document in a local memory, wherein storing includes storage of an identification of potential components of a template promotion and a selection of a subset of the potential components of the template promotion forming a final promotion;

generate, by the processor, a visualization of the promotion based on the local copy of the promotion builder document, wherein generating the visualization includes generating a document comprising a text string based on a subset of the set of template recommendations in which the variables for the subset of the set of template recommendations are replaced in the text string by corresponding data from a set of template selections, and wherein the plurality of remote users are authorized by the processor to manipulate the promotion builder document and visualize a current version of the promotion; and transmitting asynchronously received instructions to modify one or more data elements in the framework set of data elements of the promotion builder document that is stored in the remote memory, including transmitting first instructions from a first remote user to modify one or more first data elements in the framework set of data elements and second instructions from a second remote user to modify one or more second data elements in the framework set of data elements, the first instructions and the second instructions comprising instructions received asynchronously from the first remote user and the second remote user, respectively.

9. The apparatus of claim 8, wherein the computer program code, when executed by the processor, further causes the apparatus to:

modify the local copy of the promotion builder document; and refresh the visualization in response to modification of the local copy of the promotion builder document.

10. The apparatus of claim 9, wherein the computer program code, when executed by the processor, further causes the apparatus to modify one or more data elements of the framework set of data elements of the local copy of the promotion builder document.

11. The apparatus of claim 9, wherein the computer program code, when executed by the processor, further causes the apparatus to transmit the instructions to modify the one or more data elements in the framework set of data elements based on the local copy of the promotion builder document.

12. The apparatus of claim 8, wherein the computer program code, when executed by the processor, further causes the apparatus to replace, in the document, the variables from the template recommendations with the corresponding data from one or more template selections included in the framework set of data elements.

13. The apparatus of claim 8, wherein the remote memory is not physically co-located with the processor.

14. The apparatus of claim 8, wherein the computer program code, when executed by the processor, further causes the apparatus to provide different access rights for the framework set of data elements to the first remote user and the second remote user.

15. A computer program product for generating promotions which allows a plurality of remote users to view a consistent version of a promotion, the computer program product comprising a computer-readable storage medium storing computer program code that, when executed by a processor of an apparatus, causes the apparatus to:

access a promotion builder document that is stored in a remote memory, wherein the promotion is a deal indicative of a promotional value that upon purchase or acceptance results in issuance of an instrument configured to be used toward at least a portion of purchase of at least one of a particular good, service, or experience defined by the promotion, the promotion configured to be electronically transmitted to subscribers, wherein the promotion builder document comprises a framework set of data elements configured to guide assembly of the promotion, the framework set of data elements including:

a unique identifier enabling the plurality of remote users to access the promotion builder document; and a set of template recommendations extracted from a database, each template recommendation of the set of template recommendations comprising a generalized piece of editorial content comprising a variable configured as a placeholder for a promotion-specific content element;

store a local copy of the promotion builder document in a local memory, wherein storing includes storage of an identification of potential components of a template promotion and a selection of a subset of the potential components of the template promotion forming a final promotion;

generate, by the processor, a visualization of the promotion based on the local copy of the promotion builder document, wherein generating the visualization includes generating a document comprising a text string based on a subset of the set of template recommendations in which the variables for the subset of the set of template recommendations are replaced in the text string by corresponding data from a set of template selections, and wherein the plurality of remote users are authorized by the processor to manipulate the promotion builder document and visualize a current version of the promotion; and transmit asynchronously received instructions to modify one or more data elements in the framework set of data elements of the promotion builder document that is stored in the remote memory, including transmitting first instructions from a first remote user to modify one or more first data elements in the framework set of data elements and second instructions from a second remote user to modify one or more second data elements in the framework set of data elements, the first instructions and the second instructions comprising instructions received asynchronously from the first remote user and the second remote user, respectively.

16. The computer program product of claim 15, wherein the computer program code, when executed by the processor of the apparatus, further causes the apparatus to:

modify the local copy of the promotion builder document; and refresh the visualization in response to modification of the local copy of the promotion builder document.

17. The computer program product of claim 16, wherein the computer program code, when executed by the processor of the apparatus, further causes the apparatus to modify one or more data elements of the framework set of data elements of the local copy of the promotion builder document.

18. The computer program product of claim 16, wherein the computer program code, when executed by the processor of the apparatus, further causes the apparatus to transmit the instructions to modify the one or more data elements in the framework set of data elements based on the local copy of the promotion builder document.

19. The computer program product of claim 15, wherein the computer program code, when executed by the processor of the apparatus, further causes the apparatus to replace, in the document, the variables from the template recommendations with the corresponding data from one or more template selections included in the framework set of data elements.

20. The computer program product of claim 15, wherein the remote memory is not physically co-located with the processor.

21. The computer program product of claim 15, wherein the computer program code, when executed by the processor of the apparatus, further causes the apparatus to provide different access rights for the framework set of data elements to the first remote user and the second remote user.

* * * * *